Patented Sept. 25, 1951

2,568,950

UNITED STATES PATENT OFFICE 2,568,950

LATICES FROM ALKALI METAL CATALYZED POLYMERS

Willie W. Crouch, Bartlesville, Okla., assignor to Phillips Petroleum Company, a corporation of Delaware No Drawing. Application November 29, 1948, Serial No. 62,596

17 Claims. (Cl. 252—310)

This invention relates to the preparation of a synthetic latex. In one embodiment of the invention a synthetic latex is prepared from a polymer mass obtained by the polymerization of a conjugated diolefin in presence of an alkali metal catalyst. More particularly the invention relates to the polymerization of an unsaturated material in presence of an alkali metal catalyst and to the subsequent treatment of the polymer mass thus obtained to prepare an improved synthetic latex therefrom with a reduced number of operational or process steps, with a novel use of catalyst residues remaining after the polymerization and advantages as are evident from this specification and claims.

For many applications it is desirable to have latices of liquid polymers. Among these applications are adhesive formulations, blending with natural or synthetic rubber latices or latices of other polymers for improving processing and product characteristics, textile coatings, dipped objects and the like.

Liquid polymers obtained by the polymerization of conjugated diolefins have been used to prepare synthetic latices.

The polymerization of conjugated diolefins such as butadiene in the presence of alkali metals such as sodium or potassium or lithium is well known. Solid or liquid polymers may be produced using these catalysts; liquid polymers are readily formed by operating at suitable temperatures with a solvent such as benzene or n-heptane and the like to obtain a solution of a liquid polymer in the hydrocarbon solvent.

In the alkali metal polymerization of conjugated diolefins and the like it is necessary to treat the polymer in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. One of the most common methods employed in the art for preventing further action of alkali metal catalysts has been to add water to the reaction mass to convert these catalysts to alkali metal hydroxides. However, it is difficult to remove the last traces of these alkali metal hydroxides from a polymer, a fact that is well known to those skilled in the art ("German Plastics Practice" by De Bell and Richardson, Department of Commerce, 1946, page 436). Alkali metal hydroxides left in the polymers are deleterious for many uses of such polymers. For instance, a low molecular weight polymer, which is to be incorporated in low plasticity Buna-S (butadiene-styrene) type rubber for improving its processing characteristics, would impart too fast a curing rate to a compound of said rubber if it contained alkali metal hydroxides. Also, the conversion of the alkali metal catalyst to hydroxide constitutes a loss of the alkali metal. Other possible methods for the removal of the alkali metals which would depend on the formation of alkali metal salts insoluble in the polymer material would have the disadvantage of the additional processing step or steps required to remove said salts.

I have now discovered a novel process for producing latices of liquid polymeric materials prepared in the presence of alkali metal catalysts, the said polymer containing alkali metal residues (alkali metals and organoalkali metal compounds). The process of my invention comprises the simultaneous conversion of these alkali metal residues to render these residues non-catalytic and the formation in situ of an emulsifying agent which can serve as the sole emulsifying agent employed to prepare the final synthetic latex product.

According to this invention a liquid polymer resulting from an alkali metal catalyzed polymerization and still containing catalyst residues from the polymerization, as stated, is treated with a high molecular weight organic acid whose alkali metal salt is an emulsifying agent. This treatment can be effected by stirring the liquid polymer and the acid together for a short time. The organic acid will react with the alkali metal residues (alkali metal and organoalkali metal compounds) producing in situ the corresponding alkali metal salt of the acid, an emulsifying agent. Thus, according to the invention a single process step accomplishes simultaneously the inactivation of the reactive alkali metal residues and the formation in the polymer of the desired emulsifying agent. The polymeric material containing the emulsifying agent now can be mixed intimately with water by suitable means, such as an efficient stirring apparatus, a homogenizer, or the like, to produce a latex. By my process the necessity for physically removing alkali metals or their compounds from said polymeric material is obviated. Use is made of the inactivated catalyst and prior art process steps are eliminated. Also, it is unnecessary to add any emulsifying agent other than that formed in situ according to the invention, the alkali metal residues having been found to contain sufficient metal to form the required quantity of emulsifying agent in most cases.

My invention finds its application to liquid polymers made in the presence of alkali metals such as sodium, potassium or lithium, or organoalkali metal compounds such as sodium butyl, sodium triphenyl methyl and the like, or alkali metal hydrides. These organoalkali metal compounds or the alkali metal hydrides are considered to be the equivalents of the alkali metals in the scope of my invention, as they react with the said acids to produce surface active agents. Herein and in the claims the term "alkali metal catalyst" includes the organoalkali compounds and the alkali metal hydrides.

Among the high molecular weight organic acids which are applicable to the process of my invention are included alkyl sulfonic acids containing 12 to 16 carbon atoms, certain organic sulfuric acids, rosin acids, and fatty acids such as lauric, myristic, palmitic, stearic acids and the like.

Among the monomeric materials to whose polymers my invention can be applied, when the polymers have been made in the presence of alkali metals or their equivalents, are comprised unsaturated organic compounds which generally contain the characteristic structure $CH_2=C<$ and, in most cases, have at least one of the disconnected valencies attached to an electronegative group, that is, a group which increases the polar character of the molecule such as an organic group containing a double or triple bond such as vinyl, phenyl, or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; aryl olefins such as styrene, various alkyl styrenes, p-methoxy styrene, alpha-methyl styrene, vinyl naphthalene and similar derivatives thereof, and the like; methyl vinyl ether, vinyl furane, and other unsaturated compounds, ethers, etc., of the types described. Such unsaturated compounds polymerized alone, or the polymers resulting from the polymerization of mixtures of two or more of such compounds, catalyzed by alkali metals or or their equivalents, are applicable in the process of my invention.

I have generally preferred to add the organic acid before mixing the water with the polymer. However, all of the water or a portion of the water may be added before introducing the organic acid to form the emulsifying agent by reaction in situ with alkali metals or reactive alkali metal compounds. Or, some or all of the water may be added together with organic acid.

The amount of the organic acid to be added to the polymer in the process of my invention lies between 15 and 125 per cent, preferably between 50 and 90 per cent, of the amount required to react with all of the alkali metal residues (alkali metal and alkali metal compounds) present in such polymer.

The concentration of a latex produced by the process of my invention is easily controlled by regulating the quantity of water that is mixed with the polymer initially. The upper limit of concentration of polymer in a latex is dependent only upon the maximum concentration that can be tolerated in a particular system with no inversion of the phases occurring.

According to the process of this invention latices of a much lower molecular weight, in fact, of true liquids, can be prepared than is generally possible when latices are prepared by emulsion polymerization; and it is possible to vary polymer concentrations over a wider range than is generally practical in the production of latices by emulsion polymerization.

The following examples are illustrative of the invention. Parts are by weight.

*Example I*

To 450 parts of the liquid polymer, prepared by polymerizing 1,3-butadiene in the presence of sodium and a solvent at relatively high temperatures, freed of solvent and containing about 0.6 per cent sodium residues (sodium metal and organosodium compounds), expressed as sodium, were added 32 parts (equivalent to 2 parts sodium) of a disproportionated rosin acid. The acid dissolved in the polymer and the mixture was stirred for 10 minutes while the acid was being converted to the sodium rosinate. The polymer containing the surface active agent was then poured slowly into 1000 parts of water while agitating with a high speed stirring apparatus. A fluid, stable latex was produced.

*Example II*

380 parts of liquid polybutadiene were dissolved in 700 parts of n-pentane to reduce the polymer viscosity. The polybutadiene was prepared as described in Example I, and contained about 0.8 per cent sodium residues. 17 parts (equivalent to 1 part of sodium) of a disproportionated rosin acid was added to the pentane-polybutadiene solution; the acid dissolved and the mixture was stirred for 10 minutes while the acid was reacting to form the sodium rosinate. The polymer solution containing the surface active agent was then poured slowly into 1000 parts of water while agitating with a high speed stirrer. The latex formed was freed of pentane by evaporating the pentane from the latex. The remaining latex was fluid and stable.

*Example III*

A liquid polymer of 1,3-butadiene dissolved in n-heptane was prepared as described in Example I. The major portion of the solvent, n-heptane, was stripped from the polymer-n-heptane solution; the remaining solution contained 19.5 per cent n-heptane. To 642 parts of this solution, containing about 0.55 per cent sodium residues based on polymer, were added 40 parts (equivalent to 2.5 parts of sodium) of a disproportionated rosin acid, which readily dissolved in the solution with stirring and formed sodium rosinate by reaction with the sodium residues. The polymer solution containing the surface active agent was then poured slowly into 1000 parts of water while agitating with a high speed stirring apparatus. A fluid and stable latex resulted.

*Example IV*

To 450 parts of a liquid copolymer of 1,3-butadiene and styrene, prepared by the polymerization of 770 parts of 1,3-butadiene with 230 parts of styrene in the presence of sodium and a solvent at relatively high temperature, freed of solvent, and containing about 0.8 per cent sodium residues, are added with stirring 30 parts (equivalent to 2.4 parts of sodium) of stearic acid. The acid dissolves readily in the polymer and reacts to form the sodium stearate. The polymer containing the surface active agent is poured slowly into 1000 parts water, suitably agitated, to produce a latex.

Reasonable variation and modification are possible within the scope of the appended claims to the invention, the essence of which is that a process for the preparation of a synthetic latex has been set forth wherein in a single step alkali metal catalyst employed is rendered inactive and an emulsifying agent prepared in situ by the addition of certain organic acids enabling the immediate formation of said synthetic latex by direct addition to water of the organic acid treated polymeric mass, without necessity of employing any additional steps to remove undesired catalyst or to otherwise prepare the mass for the latex preparation step.

I claim:

1. The preparation of a synthetic latex from a polymeric mass obtained by the polymerization of an unsaturated material polymerizable in the presence of an alkali metal catalyst which comprises treating said polymeric mass with an organic acid the alkali metal salt of which is an emulsifying agent and admixing the treated mass with water.

2. The treatment of a polymeric mass obtained by the polymerization of an unsaturated material polymerizable in the presence of an alkali metal catalyst which comprises admixing said polymeric mass with an organic acid, the alkali metal salt of which is an emulsifying agent, to inhibit further activity of said alkali metal catalyst and to form an emulsifying agent in situ.

3. The preparation of a synthetic latex which comprises treating a polymeric mass obtained by polymerizing an organic compound containing the characteristic structure $CH_2=C<$ in the presence of an alkali metal catalyst with an organic acid the alkali metal salt of which is an emulsifying agent and then admixing the thus treated mass with water.

4. The treatment of a polymeric mass obtained by polymerizing an unsaturated organic compound polymerizable in presence of an alkali metal catalyst which comprises admixing with said mass an organic acid the alkali metal salt of which is an emulsifying agent to inhibit further activity of any of said alkali metal catalyst and to form therewith an emulsifying agent in situ.

5. The process of claim 4 wherein the unsaturated organic material comprises a diolefin and the organic acid comprises an alkyl sulfonic acid having 12–16 carbons in the molecule.

6. The process of claim 4 wherein the unsaturated organic material contains the characteristic structure $CH_2=C<$ at least one of the disconnected valencies of which is attached to an electronegative group and wherein the organic acid is a fatty acid selected from the group consisting of lauric, myristic, palmitic and stearic acids.

7. The process of claim 4 wherein the alkali metal catalyst is sodium, the unsaturated organic compound comprises butadiene and the organic acid is a rosin acid.

8. The process of claim 4 wherein the alkali metal catalyst is sodium, the unsaturated organic compound comprises butadiene and the organic acid is a disproportionated rosin acid.

9. The process of claim 4 wherein water is admixed with the polymeric mass before the organic acid is added.

10. The process of claim 4 wherein water is admixed with the polymeric mass when the organic acid is added.

11. The process for preparing a synthetic latex which comprises treating a polymeric mass obtained by polymerizing 1,3-butadiene in the presence of sodium and a solvent at an elevated temperature to separate solvent therefrom, adding a rosin acid to said reaction mass after said separation of solvent, stirring and then admixing said mass with water.

12. The process of claim 11 wherein the acid is a disproportionated rosin acid.

13. The process for preparing a synthetic latex which comprises treating a polymeric mass obtained by polymerizing 1,3-butadiene and styrene in the presence of an alkali metal catalyst and a solvent at an elevated temperature to remove the solvent from the resulting reaction mass, adding stearic acid to said reaction mass to inhibit further activity of said catalyst and to form an emulsifying agent in situ and then adding the resulting mass to water.

14. The process of claim 4 wherein the unsaturated organic material contains the characteristic structure $CH_2=C<$ at least one of the disconnected valencies of which is attached to an electronegative group and wherein the organic acid is stearic acid.

15. The process of claim 4 wherein the alkali metal catalyst is sodium; the unsaturated compound comprises butadiene and the organic acid is stearic acid.

16. The process of claim 4 wherein the water is admixed with the polymeric mass after the organic acid is added.

17. The process for preparing a synthetic latex which comprises treating a polymeric mass obtained by polymerizing 1,3-butadiene in the presence of sodium and a solvent at an elevated temperature to separate solvent therefrom, adding stearic acid to said reaction mass after said separation of solvent, stirring and then admixing said mass with water.

WILLIE W. CROUCH.

REFERENCES CITED

The following references are of record in the file of this patent:

UNITED STATES PATENTS

| Number | Name | Date |
| --- | --- | --- |
| 1,880,918 | Ebert et al. | Oct. 4, 1932 |
| 2,265,364 | Fowler et al. | Dec. 9, 1941 |
| 2,483,887 | Crouch | Oct. 4, 1949 |
| 2,487,333 | Hansley | Nov. 8, 1949 |